United States Patent
Starmans et al.

(10) Patent No.: US 11,879,769 B2
(45) Date of Patent: Jan. 23, 2024

(54) AUTOMATIC COOKING ASSISTANCE DEVICE AND METHOD TO PROVIDE COOKING INSTRUCTIONS

(71) Applicant: KONINKLIJKE PHILIPS N.V., Eindhoven (NL)

(72) Inventors: Franciscus Jozef Marie Starmans, Ebenthal (AT); Roland Waldner, Poggersdorf (AT)

(73) Assignee: KONINKLIJKE PHILIPS N. V., Eindhoven (NL)

( * ) Notice: Subject to any disclaimer, the term of this patent is extended or adjusted under 35 U.S.C. 154(b) by 394 days.

(21) Appl. No.: 15/733,105

(22) PCT Filed: Nov. 15, 2018

(86) PCT No.: PCT/EP2018/081290
§ 371 (c)(1),
(2) Date: May 18, 2020

(87) PCT Pub. No.: WO2019/101608
PCT Pub. Date: May 31, 2019

(65) Prior Publication Data
US 2020/0363258 A1    Nov. 19, 2020

(30) Foreign Application Priority Data

Nov. 23, 2017   (EP) ..................... 17203242

(51) Int. Cl.
*G01G 19/24*   (2006.01)
*G01G 19/414*  (2006.01)
(Continued)

(52) U.S. Cl.
CPC .............. *G01G 19/56* (2013.01); *A47J 27/62* (2013.01); *A47J 36/321* (2018.08); *A47J 43/04* (2013.01);
(Continued)

(58) Field of Classification Search
CPC ...... G01G 19/22; G01G 19/24; G01G 10/414; G01G 19/4146; G01G 19/52; G01G 19/56;
(Continued)

(56) References Cited

U.S. PATENT DOCUMENTS 4,807,169 A * 2/1989 Overbeck .......... G09B 19/0092
708/133
8,829,365 B1 * 9/2014 Wallace ................. G01G 19/56
177/25.14
(Continued)

FOREIGN PATENT DOCUMENTS

CN    103395521 A    11/2013
CN    103455772 A    12/2013
(Continued)

OTHER PUBLICATIONS

International Search Report and Written Opinion dated Jan. 14, 2019 for International Application No. PCT/EP2018/081290 Filed Nov. 15, 2018.

*Primary Examiner* — Randy W Gibson
(74) *Attorney, Agent, or Firm* — Maschoff Brennan

(57) ABSTRACT

A cooking assistance device is for weighing a kitchen appliance or food container and then calculating a weight of food contained by the kitchen appliance or container based on a known dry weight. The food weight is provided to cooking aid device (which may be an integral part of the assistance device or it may be a remote device) for providing cooking instructions to a user. The device is thus able to coordinate the use of multiple kitchen appliances or utensils for example when a recipe is being followed by a user, with user instructions, information or advice being provided.

14 Claims, 2 Drawing Sheets

(51) Int. Cl.
*A47J 43/04* (2006.01)
*A47J 36/32* (2006.01)
*G01G 19/56* (2006.01)
*G01G 19/52* (2006.01)
*A47J 27/62* (2006.01)
*A47J 43/07* (2006.01)

(52) U.S. Cl.
CPC ........... *G01G 19/24* (2013.01); *G01G 19/414* (2013.01); *G01G 19/52* (2013.01); *A47J 2043/0733* (2013.01); *G01G 19/4146* (2013.01)

(58) Field of Classification Search
CPC ....... G01G 19/414; A47J 36/321; A47J 27/62; A47J 43/04; A47J 2043/0733
See application file for complete search history.

(56) References Cited

U.S. PATENT DOCUMENTS

| | | | |
|---|---|---|---|
| 9,389,117 B2* | 7/2016 | Merea | G01G 19/415 |
| 10,480,990 B1* | 11/2019 | Wallace | G09B 5/04 |
| 10,955,283 B2* | 3/2021 | Hogea | G01G 19/30 |
| 10,990,418 B1* | 4/2021 | Wallace | G06F 9/451 |
| 11,062,620 B1* | 7/2021 | Wallace | G09B 19/0092 |
| 11,272,810 B2* | 3/2022 | Jimenez | A47J 36/321 |
| 2013/0241743 A1 | 9/2013 | Loic | |
| 2016/0018255 A1 | 1/2016 | Fang | |
| 2016/0048720 A1 | 2/2016 | Palmer | |
| 2016/0252390 A1 | 9/2016 | Batsikouras | |
| 2017/0035249 A1 | 2/2017 | Dickson | |

FOREIGN PATENT DOCUMENTS

| | | |
|---|---|---|
| CN | 103577914 A | 2/2014 |
| CN | 107101707 A | 8/2017 |
| CN | 107209050 A | 9/2017 |
| DE | 19950250 A1 | 4/2001 |
| WO | 2007096574 | 8/2007 |

* cited by examiner

AUTOMATIC COOKING ASSISTANCE DEVICE AND METHOD TO PROVIDE COOKING INSTRUCTIONS

CROSS REFERENCE TO RELATED APPLICATIONS

This application is the U.S. National Phase application under 35 U.S.C. § 371 of International Application No. PCT/EP2018/081290 filed Nov. 15, 2018, published as WO 2019/101608 on May 31, 2019, which claims the benefit of European Patent Application Number 17203242.7 filed Nov. 12, 2017. These applications are hereby incorporated by reference herein.

FIELD OF THE INVENTION

This invention relates to a cooking assistance device, which provides cooking instructions to a user to assist them in following a recipe or other set of cooking procedures.

BACKGROUND OF THE INVENTION

There has been a significant amount of research into more interactive cooking solutions. The basic idea is to provide a more interactive cooking experience, by providing a system with a display or other user interface function to assist the user in their cooking tasks.

For example, a display may be used to display recipes, cooking instructions for a selected recipe, or other information. It may also enable interaction with social media or other information over the internet to provide a more rewarding cooking experience.

Various design concepts have been proposed which incorporate various smart features such as guided cooking, gesture recognition, and connected apps. Guided cooking approaches facilitate step-by-step following of recipes, and this is becoming increasingly popular. More and more appliances in the kitchen will be equipped with functions to deliver information or calculations of calorie intake, sugar content, salt content etc. of food for input to an overall control system. There is an increasing interest in this nutritional and health information for food being prepared and eaten.

A user typically has a set of different cooking appliances, such as an air fryer, a juicer, a blender, a food processor, a mixing bowl, a storage bowl etc. If each such appliance or utensil is to be compatible with the main guided cooking controller, it has to be equipped with the same components to deliver the same information to the main controller, for example relating to nutrition, health and quantity. One of the basic functions and information needed for such calculations is the weight of the food. Thus, each appliance may incorporate a weighing apparatus to provide the required information to the main guided cooking controller. This increases the cost of the overall system, with duplication of some functions.

There is a need for a system which enables assisted cooking to be provided but without excessively increasing the cost of the various compatible cooking appliances and utensils.

SUMMARY OF THE INVENTION

The invention is defined by the claims.

According to examples in accordance with an aspect of the invention, there is provided a cooking assistance device comprising:

a weighing apparatus;

an identifying unit for identifying a kitchen appliance or utensil placed on the weighing apparatus or receiving a kitchen appliance or utensil identification;

a calculating unit for calculating a weight of food contained by the kitchen appliance or utensil based on a dry weight of the identified kitchen appliance or utensil; and a communications unit for communicating the weight of food to a cooking aid device for providing cooking instructions to a user which depend on the weight of food.

This cooking assistance device is able to measure the amount of food contained by different kitchen appliances or utensils, by identifying the appliance or utensil, weighing the appliance or utensil and then deriving the weight of food based on the dry weight. The dry weight may be known by the cooking assistance device by looking up data using the identification of the kitchen appliance or utensil, or it may received as an input by a user or as part of electronic identification information communicated from the appliance or utensil to the cooking assistance device. This device is thus able to coordinate the use of multiple kitchen appliances or utensils for example when a recipe is being followed by a user, with assistance (i.e. instructions and optionally some direct control) being provided by the assistance device. The assistance device removes the need for each different type of appliance to have its own integrated weighing system, thereby reducing the cost of the overall suite of kitchen appliances, which together implement an overall assisted cooking system. The "dry" weight is to be understood as the weight with no food content. The utensil is typically a food container.

The calculating unit may perform a subtraction of a dry weight from a measured weight, or it may perform a zeroing function. For example, a user may input a zeroing command. The calculating unit then performs a weight measurement.

The kitchen appliances may comprise food preparation devices (blenders, juicers, mixers, food processors) or food cooking devices (air fryer, bread maker). The utensils may comprise other passive devices such as mixing bowls, plates or other containers.

The food weight is the most basic food information which can be provided by the central system. Other parameters are for example the ripeness, sugar or salt content.

The communications unit for example comprises:

a docking station for an external communications device which functions as the cooking aid device; or a wireless communications interface for communicating with an external communications device which functions as the cooking aid device.

In this set of examples, the cooking aid device is an external device. The cooking aid device may for example comprise a smart phone or tablet of the user, which communicates with the assistance device, either in a wired or wireless manner. The cooking aid device is for receiving user commands relating to a recipe to be followed and for presenting cooking instructions to a user which depend at least on the weight of food. This weight of food is provided by the cooking assistance device which thus performs at least part of the task of recipe following. The cooking aid device may also provide other information such as nutritional information.

The cooking assistance device may instead further comprise the cooking aid device. In this set of examples, the cooking assistance device incorporates the cooking aid device, providing a complete integrated solution. The cooking assistance device then itself provides the cooking instructions to the user. For example, the communications unit first provides information to the cooking aid device (which determines the cooking instructions) and then from the cooking aid device to the user.

The cooking assistance device may then comprise a processor for deriving cooking instructions which depend on the weight of food and a display for displaying the cooking instructions.

A user interface is for example provided for receiving user commands relating to a recipe to be followed.

In this example, the user interface is part of the cooking assistance device, and the user may make recipe selections using the assistance device. The user interface may be part of the cooking aid device, which in turn is part of the cooking assistance device in this example.

In one set of examples, the identifying unit may comprise a receiving unit for obtaining identification of the kitchen appliance or utensil by a wired or wireless connection to the kitchen appliance or utensil.

This is one way for the assistance device to identify the kitchen appliance or utensil. The identification may include the weight of the appliance or utensil or this may be obtained from another database which maps between appliance identity and weight. This database may be external to the system or it may be part of the system itself.

The receiving unit for example comprises an RFID reader for reading an RFID tag of the kitchen appliance or utensil.

In another set of examples, the identifying unit is adapted to identify the kitchen appliance or utensil based on weight information.

This weight information is for example simply a measured dry weight, but it could include a function of weight information over time. For example, different appliances of similar weight may have different weight information over time. This provides another way for the assistance device to identify the kitchen appliance or utensil. The weight of the kitchen appliance or utensil (and optionally information about a weight time function) may be stored as part of a calibration routine or the assistance device may have stored information about all compatible appliances.

The device may further comprise a kitchen appliance interface for receiving data from kitchen appliances relating to cooking or for food preparation processes being followed by the kitchen appliances.

In this way, the cooking assistance device is able to monitor parameters other than just weight (such as temperature, cooking profile etc.) and take these into account either for automatically controlling the kitchen appliances or providing user instructions. These kitchen appliances do not all need to be ones that can be weighed. For example, data may be received from a fixed oven about the cooking process that is being followed so that the instructions to the user may include instructions relating to appliances other than those which can be weighed.

The kitchen appliance interface is for example for providing instructions to an appliance relating to cooking or food preparation processes to be followed.

This provides a more automated control, in that at least part of the cooking process is controlled by the assistance device (directly or via the intermediary of an external cooking aid device).

The invention also provides a cooking assistance method, comprising:

using a cooking assistance device to identify a kitchen appliance or utensil placed on a weighing apparatus of the cooking assistance device or to receive a kitchen appliance or utensil identification;

calculating a weight of food contained by the kitchen appliance or utensil based on a dry weight of the identified kitchen appliance or utensil; and communicating the weight of food to a cooking aid device for providing cooking instructions to a user which depend on the weight of food.

Identifying a kitchen appliance or utensil for example comprises obtaining identification of the kitchen appliance or utensil by a wired or wireless connection to the kitchen appliance or utensil, or identifying the kitchen appliance or utensil based on its weight.

Communicating the weight of food for example comprises communicating with an external communications device using a docking station or using a wireless communications interface.

The method may comprise:

receiving user commands relating to a recipe to be followed;

receiving data from kitchen appliances relating to cooking or food preparation processes being followed by the kitchen appliances; and presenting cooking instructions to the user which depend at least on the weight of food.

This provides a more automated cooking control process.

The cooking assistance device for example may provide instructions to kitchen appliances relating to cooking or food preparation processes to be followed.

BRIEF DESCRIPTION OF THE DRAWINGS

Examples of the invention will now be described in detail with reference to the accompanying drawings, in which.

DETAILED DESCRIPTION OF THE EMBODIMENTS

Figure 1:
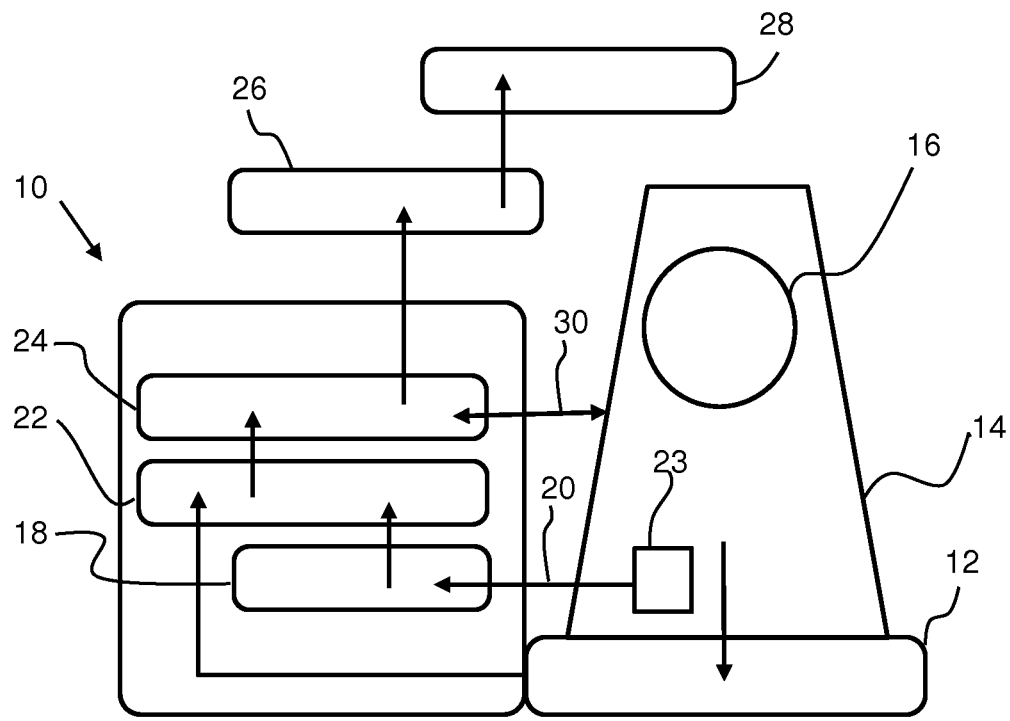
FIG. 1 shows a first example of a cooking assistance device.

The invention will be described with reference to the Figures.

It should be understood that the detailed description and specific examples, while indicating exemplary embodiments of the apparatus, systems and methods, are intended for purposes of illustration only and are not intended to limit the scope of the invention. These and other features, aspects, and advantages of the apparatus, systems and methods of the present invention will become better understood from the following description, appended claims, and accompanying drawings. It should be understood that the Figures are merely schematic and are not drawn to scale. It should also be understood that the same reference numerals are used throughout the Figures to indicate the same or similar parts.

The invention provides a cooking assistance device which is for weighing a kitchen appliance or food container and then calculating a weight of food contained by the kitchen appliance or container based on a known dry weight. The food weight is provided to cooking aid device (which may be an integral part of the assistance device or it may be a remote device) for providing cooking instructions to a user and optionally also for performing automated cooking control. The device is thus able to coordinate the use of multiple kitchen appliances or utensils for example when a recipe is being followed by a user, with user instructions, information, advice or cooking automation being provided.

FIG. 1 shows a first example of a cooking assistance device 10. It comprises a weighing apparatus 12 such as a weighing scale or other pressure sensor device which is for weighing a cooking appliance 14 (or a utensil such as a bowl) which contains a food item 16. For simplicity, the appliance or utensil will in general simply be referred to as an appliance below.

The appliance may be any portable food preparation or cooking device such as a blender, mixer, juicer, air fryer, whisking bowl etc.

The assistance device 10 has an identifying unit 18 for identifying the kitchen appliance 14 placed on the weighing apparatus 12. In the example shown, identification information 20 is passed from the appliance 14 to the identifying unit 18. This information may be provided as a wired connection between the appliance 14 and the assistance device 10, for example implemented when the appliance is docked onto the device 10. Alternatively, a wireless link may be provided between the assistance device and the appliance. For this purpose, the appliance for example has an RFID tag 23 and the assistance device has an RFID reader as part of the identifying unit 18. At the simplest level, the identifying unit is an input for receiving information, which may be electronic information from the kitchen appliance or even manual user input.

A calculating unit 22 is provided for calculating a weight of food contained by the appliance 14 or based on a known dry weight of the identified appliance. The known dry weight may be stored in a table of known compatible devices, or it may be part of the identification information 20. The calculation is of course simply a subtraction of the dry weight from the measured weight. The calculation may instead comprise a zeroing function followed by a weighing, so that a weight measurement is taken with the scale zeroed to compensate for the dry weight.

A communications unit 24 is provided for communicating the weight of food to a cooking aid device 26 for providing cooking instructions to a user 28 which depend on the weight of food.

This cooking assistance device 10 is able to measure the amount of food contained by different kitchen appliances or utensils 14, by identifying the appliance or utensil, weighing the appliance or utensil and then deriving the weight of food based on the known dry weight.

The cooking aid device 26 enables a recipe to be followed by the user. Typically, it comprises a display for providing instructions and information. The assistance device 10 means that the different appliances do not need to have built-in weighing capability.

FIG. 1 shows the cooking aid device 26 as separate to the main body of the assistance device. The cooking aid device 26 for example comprises a smart phone or tablet, which can be docked to the assistance device 10 or can communicate wirelessly with it.

In addition to providing instructions to the user, the cooking aid device 26 is also for receiving user commands relating to a recipe to be followed. This may simply be a recipe selection, but it may include preferences about the way a recipe is to be followed or adapted. The assistance device 10 thus performs at least part of the task of recipe following by taking account of the weight of food items. For example, it may scale a recipe according to the amount of a first ingredient provided, or it may adapt recipes according to a user's preferences (for example low salt, low fat etc.). The cooking aid device 26 may also provide other information such as nutritional information.

The assistance device 10 may simply provide instructions to the user, but more preferably it plays a role in the automation of the cooking process. For this purpose, for appliances which perform a food processing or food cooking function, there is also communication from the assistance device 10 to the appliance as shown by arrow 30.

For this purpose, the communications unit 24 may also function as a kitchen appliance interface for receiving data from kitchen appliances relating to cooking or food preparation processes being followed by the kitchen appliances. This kitchen appliance interface also enables control instructions to be provided to the cooking appliance.

In this way, the cooking assistance device is able to monitor parameters other than just weight (such as timings, temperature, cooking profile etc.) and take these into account either for automatically controlling the kitchen appliances or providing user instructions. These kitchen appliances do not all need to be ones that can be weighed. For example, data may be received from a fixed oven about the cooking process that is being followed so that the instructions to the user may include instructions relating to appliances other than those which can be weighed.

In this way, the assistance device 10 can control the operation of the appliance or deliver information to the appliance needed for cooking. This may involve providing timing, temperature and/or speed control information to the appliance. There may also be feedback from the appliance to the assistance device 10 so that there is monitoring of the cooking or food preparation process. This feedback may be based on sensors in the appliance. A most basic sensor is of course a temperature sensor, but other sensors may be provided for example for measuring ripeness or freshness or sugar content (of food in a storage vessel or juice in a juicer). Sensors for key compounds may be provided such as acrylamide, which experiences a content increase during the cooking process in an air fryer. The assistance device may then use all available information to control the cooking process and/or provide advisory information or instructions to the user.

For the example of FIG. 1, the data processing may be divided in any manner between the calculating unit 22 and the cooking aid device 26 (which is a remote smart device) and the smart device functions as the user interface with a display output and optionally also or voice output or other user interface.

A most basic implementation makes use only of a weighing function. This weighing function may even be used to identify the appliance, thus avoiding the need for the RFID tag 23. For this purpose, the assistance device is first calibrated. The user places an appliance on the weighing apparatus and inputs to the device the type (and name and model) of the appliance. The assistance device 10 then obtains a dry weight for the appliance and it can then automatically provide recipes relevant for the appliance for further use.

The assistance device may by default be compatible with a set of standard appliances, and their dry weights may thus be pre-stored in the calculating unit 22 or obtained over the internet by an app running on the cooking aid device 26.

Some recipes will require the use of different appliances. For example, a mixture may have to be prepared in a blender and the blend then has to be placed into a kneading appliance. In such a recipe, the user is first guided to prepare the blend in the blender standing at the assistance device. Once the blend has been placed into the kneading machine for further processing, the assistance device guides the user to put the kneading appliance onto the platform. The platform automatically identifies the kneading appliance and continues with guidance for the kneading process steps.

Figure 2:
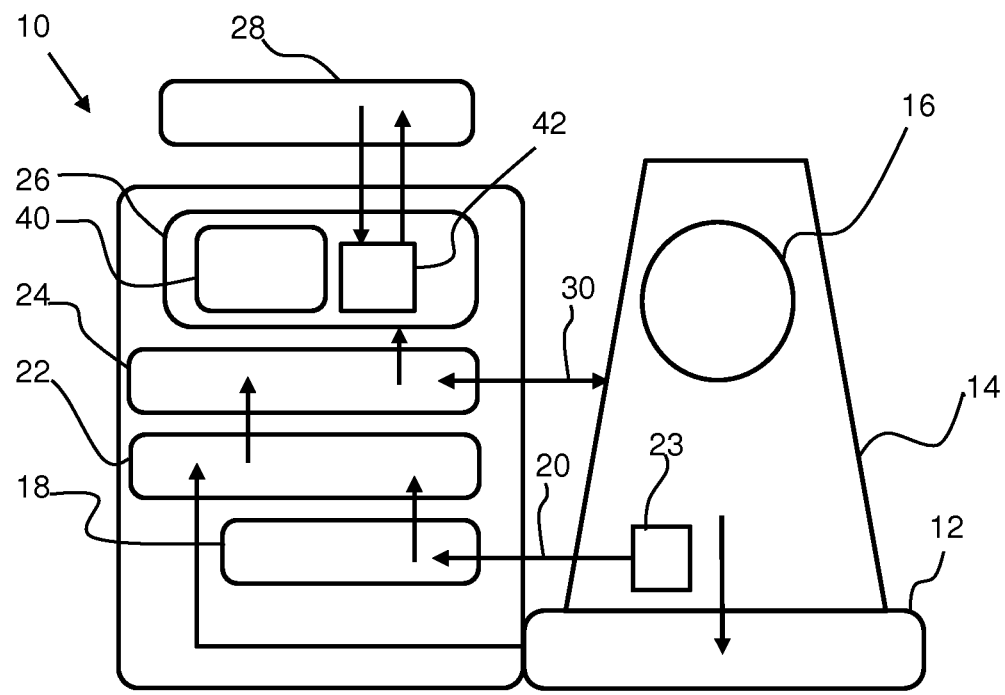
FIG. 2 shows a second example of a cooking assistance device.

FIG. 2 shows an alternative arrangement. The same reference numerals are used as in FIG. 1. In this example, the assistance device 10 incorporates the cooking aid device 26, providing a complete integrated solution.

The cooking assistance device 10 comprises a processor for deriving cooking instructions which depend on the weight of food and a display 40 for displaying the cooking instructions. The cooking instructions may comprise user information and/or control commands for the appliances. The processor is for example implemented by the calculating unit 22.

A user interface 42 is provided for receiving user commands relating to a recipe to be followed. In this example, the user interface 42 is part of the cooking aid device 26 and hence part of the overall assistance device 10, and the user may make recipe selections using the assistance device.

Figure 3:
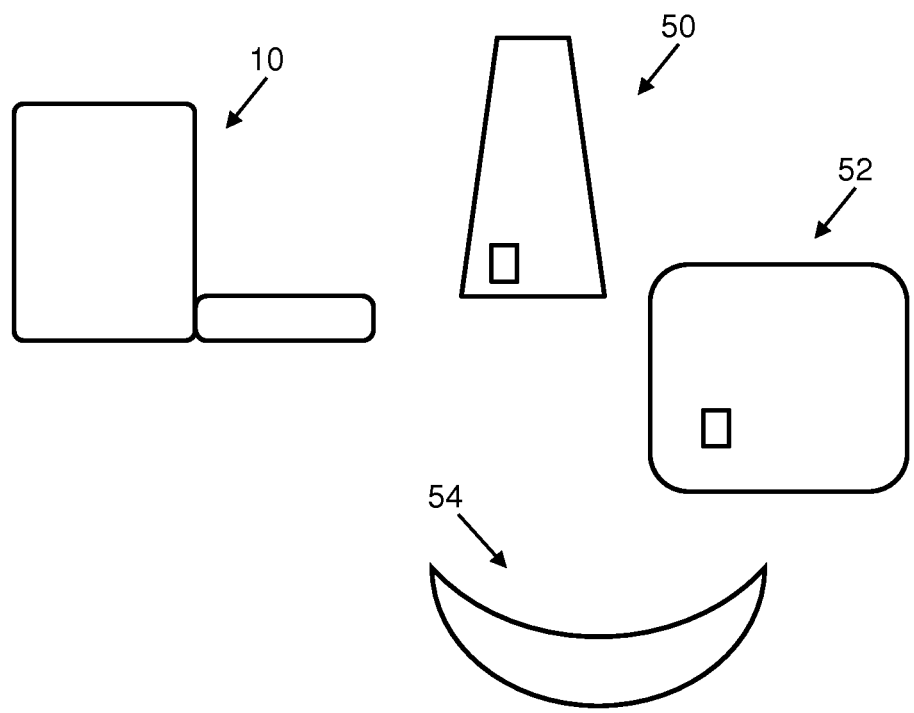
FIG. 3 shows a cooking assistance system.

FIG. 3 shows how one assistance device 10 may be associated with different appliances 50, 52 and utensils 54 together forming an overall system. Some of these appliances and utensils may be part of the system with dedicated communications capability, but others may not. For example, the bowl 54 may not be part of the system. The assistance device 10 may be calibrated to store the dry weight of the bowl so that the user can in future use the bowl simply for weighing food items. Some appliances may only provide identification information (i.e. one way communication) and others may be controllable (i.e. two way communication).

Figure 4:
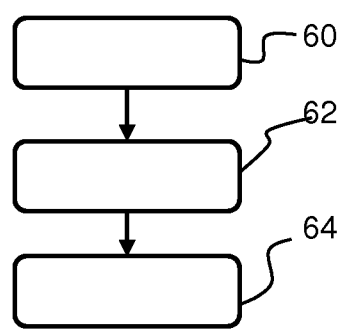
FIG. 4 shows a cooking assistance method.

FIG. 4 shows a cooking assistance method, comprising:
in step 60, using a cooking assistance device to identify a kitchen appliance or utensil placed on a weighing apparatus of the cooking assistance device;
in step 62, calculating a weight of food contained by the kitchen appliance or utensil based on a known dry weight of the identified kitchen appliance or utensil; and
in step 64 communicating the weight of food to a cooking aid device for providing cooking instructions to a user which depend on the weight of food.

The examples above show how weighing functions may be removed from the appliances, to avoid duplication of functions and components. Other components may also be provided only in the assistance device. For example, the assistance device may have a graphical user interface to enable user friendly input and output of control commands and information. The individual appliances may then have a cut down user interface. They are preferably fully functional without using the assistance device, but the user interface information relating to a guided cooking process, and the interface for providing automated control, may only be present in the assistance device, so that the additional complexity required by the appliances is kept to a minimum.

The cooking appliance may communicate with the cooking assistance device over the mains by using mains signaling. Thus, when an appliance is plugged in, it may provide identification to the cooking assistance device over the mains.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage. Any reference signs in the claims should not be construed as limiting the scope.

The invention claimed is:

1. A cooking assistance device comprising:
a weighing apparatus;
an identifying unit for identifying a kitchen appliance or utensil placed on the weighing apparatus by receiving a kitchen appliance or utensil identification and for obtaining a dry weight of the kitchen appliance or utensil received with the identification as a part of electronic identification information communicated from the kitchen appliance or utensil to the cooking assistance device;
a calculating unit for calculating a weight of food contained by the kitchen appliance or utensil based on the dry weight of the identified kitchen appliance or utensil; and
a communications unit for communicating the weight of food to a cooking aid device for providing cooking instructions to a user which depend on the weight of food.

2. The device as claimed in claim 1, wherein the communications unit comprises:
a docking station for an external communications device which functions as the cooking aid device; or
a wireless communications interface for communicating with the external communications device which functions as the cooking aid device.

3. The device as claimed in claim 1 which further comprises the cooking aid device.

4. The device as claimed in claim 3, wherein the cooking assistance device further comprises a processor for deriving the cooking instructions which depend on the weight of food and a display for displaying the cooking instructions.

5. The device as claimed in claim 3, further comprising a user interface for receiving user commands relating to a recipe to be followed.

6. The device as claimed in claim 1, wherein the identifying unit comprises a receiving unit for obtaining identification of the kitchen appliance or utensil by a wired or wireless connection to the kitchen appliance or utensil.

7. The device as claimed in claim 6, wherein the receiving unit comprises an RFID reader for reading an RFID tag of the kitchen appliance or utensil.

8. The device as claimed in claim 1, further comprising a kitchen appliance interface for receiving data from kitchen appliances relating to cooking or food preparation processes being followed by the kitchen appliances.

9. The device as claimed in claim 8, wherein the kitchen appliance interface is further used for providing instructions to an appliance relating to cooking or food preparation processes to be followed.

10. A cooking assistance method, comprising:
using a cooking assistance device to identify a kitchen appliance or utensil placed on a weighing apparatus of the cooking assistance device by receiving a kitchen appliance or utensil identification;
obtaining a dry weight of the kitchen appliance or utensil received with the identification as a part of electronic identification information communicated from the kitchen appliance or utensil to the cooking assistance device;

calculating a weight of food contained by the kitchen appliance or utensil based on a dry weight of the identified kitchen appliance or utensil; and communicating the weight of food to a cooking aid device for providing cooking instructions to a user which depend on the weight of food.

11. The method as claimed in claim 10, wherein identifying the kitchen appliance or utensil comprises obtaining identification of the kitchen appliance or utensil by a wired or wireless connection to the kitchen appliance or utensil.

12. The method as claimed in claim 10, wherein communicating the weight of food comprises communicating with an external communications device using a docking station or using a wireless communications interface.

13. The method as claimed in claim 10, comprising:
receiving user commands relating to a recipe to be followed;
receiving data from kitchen appliances relating to cooking or food preparation processes being followed by the kitchen appliances; and
presenting cooking instructions to the user which depend at least on the weight of food.

14. The device as claimed in claim 13, comprising the cooking assistance device providing instructions to kitchen appliances relating to the cooking or food preparation processes to be followed.

\* \* \* \* \*